(12) United States Patent
Chowdhury et al.

(10) Patent No.: US 7,154,562 B1
(45) Date of Patent: Dec. 26, 2006

(54) METHODS AND CIRCUITS FOR IMPLEMENTING PROGRAMMABLE GAMMA CORRECTION

(75) Inventors: Ahsan Chowdhury, Austin, TX (US); Anand Venkitachalam, Murugeshpalya (IN); John Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 487 days.

(21) Appl. No.: 10/685,128

(22) Filed: Oct. 14, 2003

(51) Int. Cl.
*H04N 5/202* (2006.01)
*H04N 9/69* (2006.01)

(52) U.S. Cl. .................................. 348/674; 348/675

(58) Field of Classification Search ........ 348/254–256, 348/674–677; 358/519; 382/167, 169; 345/589, 345/600, 690, 63, 77, 89; 341/139, 140
See application file for complete search history.

(56) References Cited

U.S. PATENT DOCUMENTS

| | | | |
|---|---|---|---|
| 4,503,464 A | | 3/1985 | Dielhof |
| 5,175,621 A * | | 12/1992 | Maesato ..................... 348/676 |
| 5,243,426 A | | 9/1993 | Murayama |
| 5,282,036 A * | | 1/1994 | Worley et al. ............... 348/674 |
| 5,408,267 A * | | 4/1995 | Main ........................... 348/254 |
| 5,706,058 A * | | 1/1998 | Okada ........................ 348/674 |
| 6,166,781 A * | | 12/2000 | Kwak et al. ................. 348/674 |
| 6,266,103 B1 * | | 7/2001 | Barton et al. ............... 348/675 |
| 6,340,996 B1 * | | 1/2002 | Nakamura ................... 348/675 |
| 6,633,343 B1 * | | 10/2003 | Ito et al. ...................... 348/674 |
| 6,697,127 B1 * | | 2/2004 | Suzuki ........................ 348/674 |
| 6,727,959 B1 * | | 4/2004 | Eskin .......................... 348/674 |

* cited by examiner

*Primary Examiner*—Victor R. Kostak
(74) *Attorney, Agent, or Firm*—James J. Murphy; Thompson & Knight, LLP

(57) ABSTRACT

A method of gamma correction includes selecting lower and upper reference curves corresponding to selected reference gamma values. A gamma correction curve is generated from a corresponding gamma correction value and cross-correlated with the upper and lower reference curves to generate a corresponding set of cross-correlation factors. The set of cross-correlation factors are stored and indexed to the corresponding gamma value. An input value is received for gamma correction with the corresponding gamma value. Data from the upper and lower reference curves indexed by the input value are then operated one with the cross-correlation factors to generate a gamma corrected output value.

19 Claims, 5 Drawing Sheets

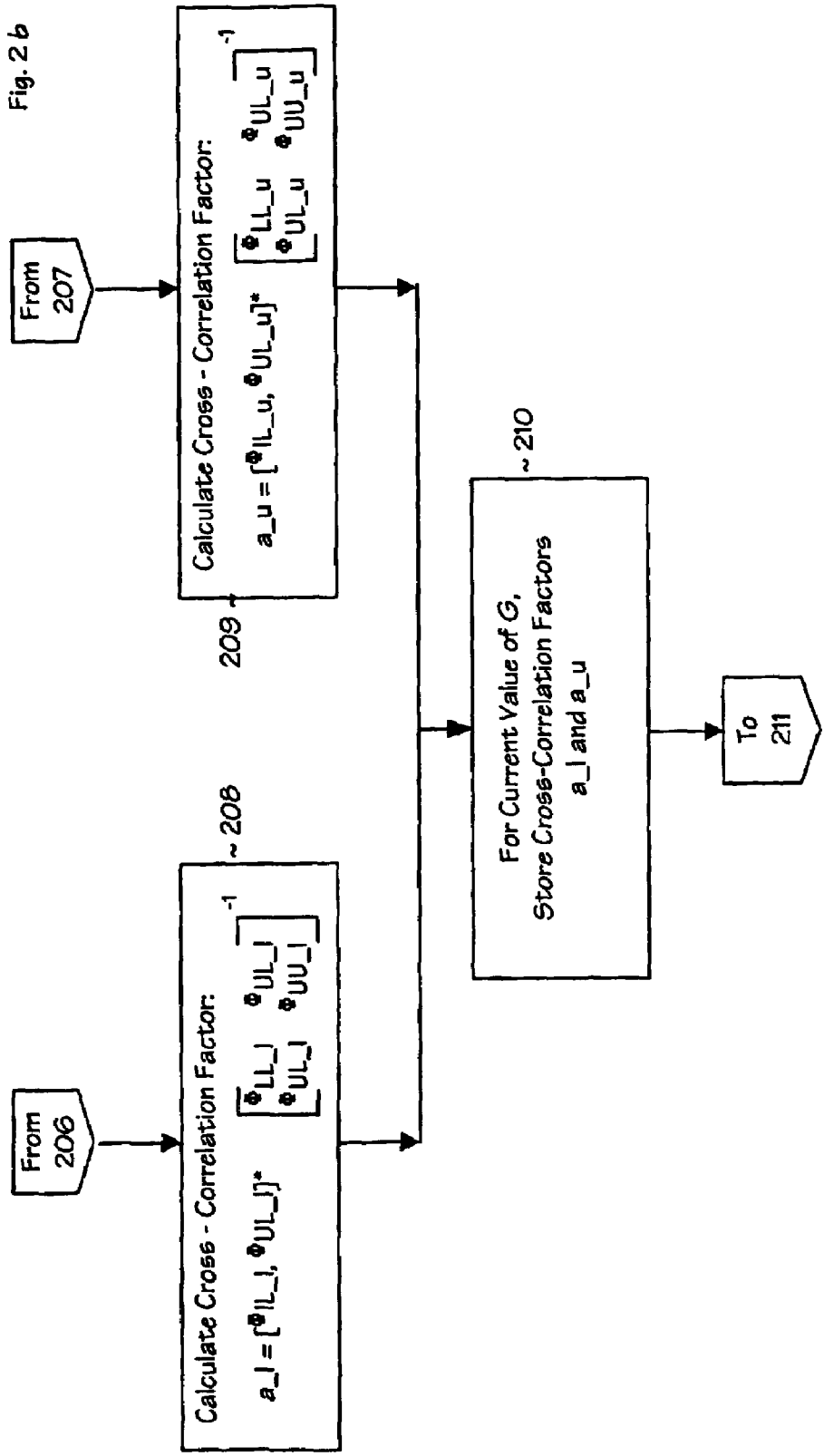

METHODS AND CIRCUITS FOR IMPLEMENTING PROGRAMMABLE GAMMA CORRECTION

FIELD OF INVENTION

The present invention relates in general to video processing and in particular to methods and circuits for implementing programmable gamma correction.

BACKGROUND

Gamma correction is a well-known technique for controlling the luminance (brightness) of the display pixels produced by cathode ray tube (CRT) displays and the like. Generally, the actual luminance of each pixel on the display screen has a non-linear relationship with the corresponding pixel data, such as the digital pixel data output from the DVD decoder. For most CRT displays, this non-linear relationship is the power function $x^\gamma$, in which x is the brightness of the given pixel defined by the pixel data, $\gamma$ is the gamma value for the given display system, and $x^\gamma$ is the actual brightness of the pixel produced by the display system. Normally, the values of x correspond to analog display control voltages between (0) and one (1) volt, and therefore for a given value of x, the brightness of the corresponding pixel on the screen is typically too low. Gamma correction essentially corrects for the non-linearly in the conversion of the input pixel data into display pixels by applying the inverse function to the input data (i.e. $x^{1/\gamma}$) in either software, hardware, or both hardware and software. As a result, the overall brightness of the display pixel, as well as the ratio between color components of that display pixel, is corrected relative to the input data.

The value of $\gamma$ depends on the particular display system, as well as the lighting environment surrounding that display system during operation. Typically, the value of $\gamma$ is between 1.4 and 3.5. The typical value of $\gamma$ in the case of conventional display is 2.5, for an Apple Macintosh display, $\gamma$ is taken to be 1.8, while the NTSC standard is based on a $\gamma$ value of 2.2. Other systems, such as PAL and SECAM, assume a $\gamma$ value of 2.8. High quality video products (encoders/decoders) often also require that the error between the output of the gamma correction circuit and the ideal output, be less than two (2) least significant bits (LSBs).

One widely-used gamma correction technique utilizes a look-up-table (LUT) in memory. In this case, gamma corrected values for all possible pixel data values from the corresponding data source are pre-computed and stored in the LUT. Each pixel value input from the data source indexes a gamma corrected output value in the LUT, which is then utilized to generate the corresponding pixel on the display system's display screen. The LUT approach, however, consumes a significant amount of memory space. Furthermore, the LUT must be re-programmed each time a different gamma value is required for driving a different display system.

In another LUT—based approach, difference values are calculated between the gamma corrected output values to the display system and the linear input values from the data source. These difference values are then stored in the LUT instead of the absolute gamma corrected output values discussed above. Since the dynamic range of the difference values is less than the dynamic range of the absolute values, the size of the LUT table is reduced. However, this second approach is still not memory efficient or easily programmable.

In a further gamma correction technique, a curve representing the gamma correction operation is approximated as piecewise linear line segments. The location of the knees or edges of each piecewise segment is fixed and the output value at the knee-points are programmed in a register bank. This approach introduces significant error, especially for lower luminescence values and also requires the re-programming of registers with pre-computed values to update the gamma correction curve.

Similarly, in one additional technique, a difference curve is approximated between the gamma corrected output values and the linear input values as piece-wise linear segments. The corresponding segment information including slope, intercept, and segment end points (knee-points) are stored in a LUT or register bank. This technique has improved error characteristics but still requires a significant amount of programming, after pre-computing the segment information, to change the gamma value.

In sum, new gamma correction circuits and methods are required, which support gamma correction in a wide range of systems and which provide ease of programmability, while at the same time minimize the introduction of error.

SUMMARY OF INVENTION

A method of gamma correction includes selecting lower and upper reference curves corresponding to selected gamma values. A gamma correction curve is generated from a corresponding gamma correction value and cross-correlated with the upper and lower reference curves to generate a corresponding set of cross-correlation factors. The set of cross-correlation factors are stored and indexed to the corresponding gamma value. An input value is received for gamma correction with the corresponding gamma value. Data from the upper and lower reference curves indexed by the input value is then operated one with the cross-correlation factors to generate a gamma corrected output value.

Embodiments of the principles of the present advantages afford substantial advantages over the prior art. The use of reference curves and cross-correlation factors allow a range of gamma values to be programmed with minimal memory space. Specifically, the only memory spaces required are those necessary for storing the reference curves and the cross-correlation factors; memory space is not required for storing a large set of complete gamma correction curves since a range of gamma correction values are implicit in the stored set of cross-correlation values. Further, the desired gamma value for a given application can be directly selected, simply by writing to a single register. Additionally, the minimum error between the actual output values generated in accordance with the inventive principles and the corresponding ideal output values is reduced in view of conventional gamma correction schemes. In particular, the correlation-based (i.e. non-linear-based) interpolation of the present invention provides a substantially lower minimum error versus an ideal gamma correction curve than does conventional linear interpolation.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
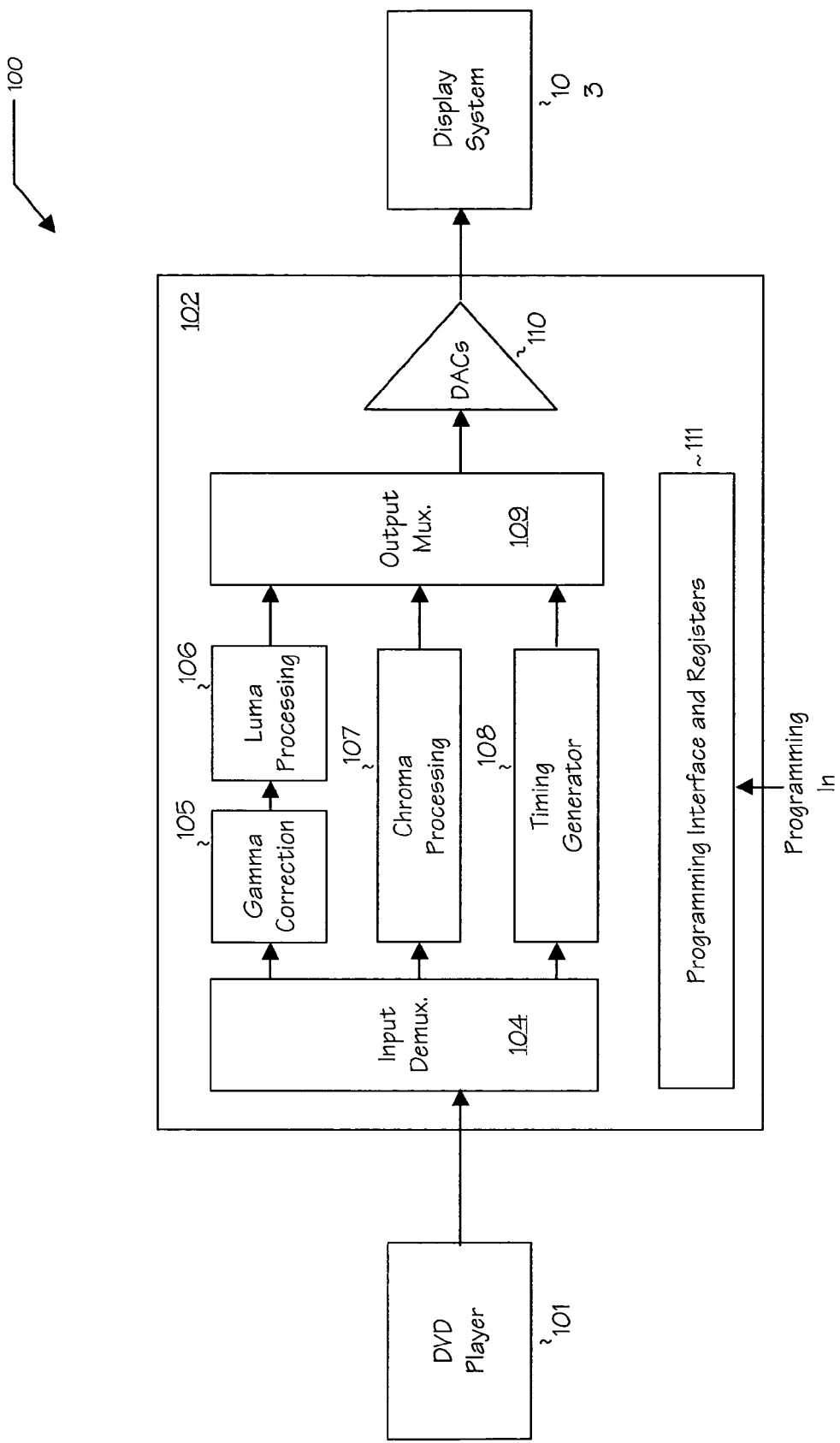
FIG. 1 is a high level block diagram of a video system suitable for describing one application of the principles of the present invention.
Figure 2A:
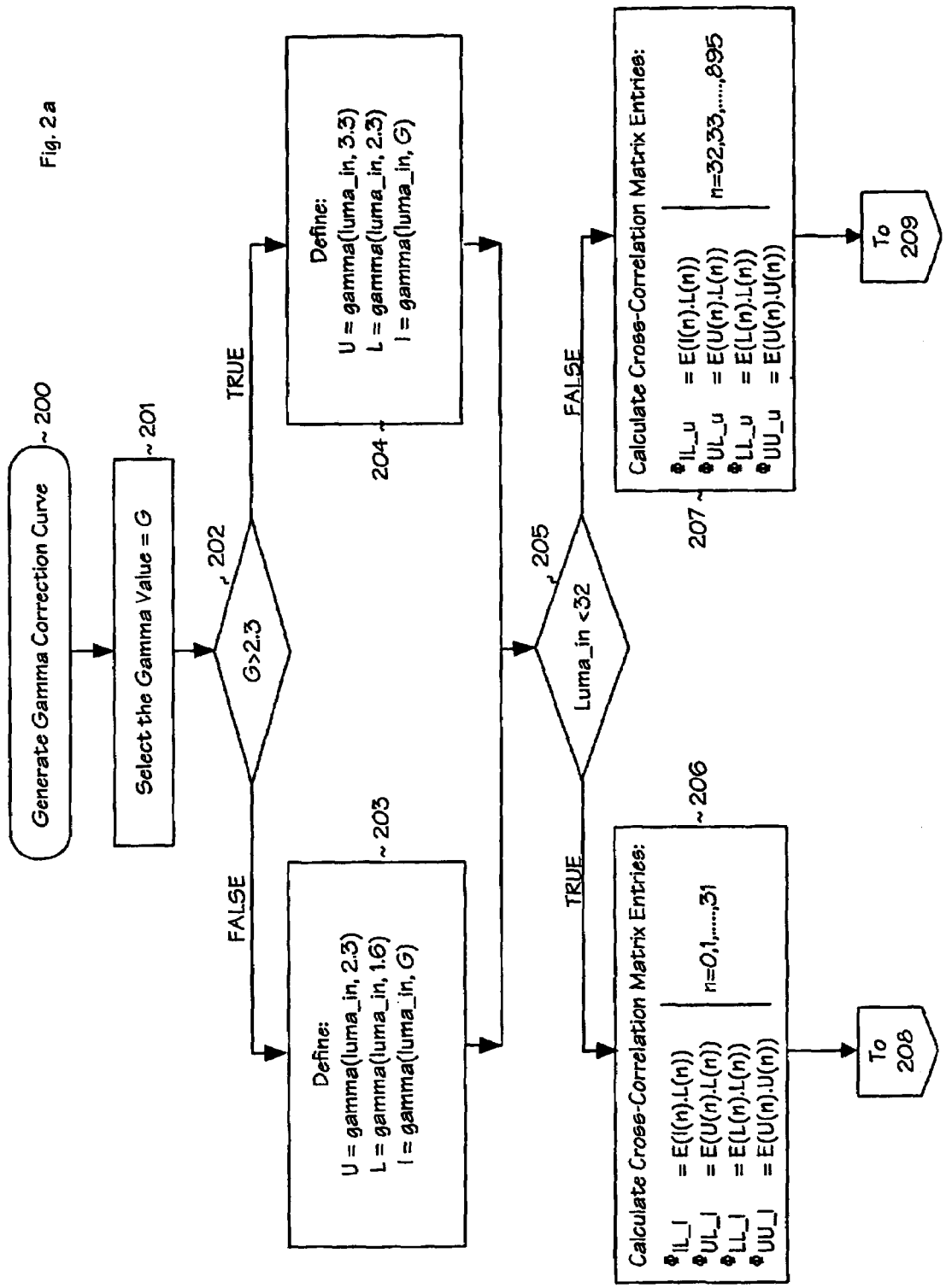
FIG. 2 is a flow chart illustrating an exemplary procedure for generating one or more desired gamma correction curves according to the present inventive principles.
Figure 2C:
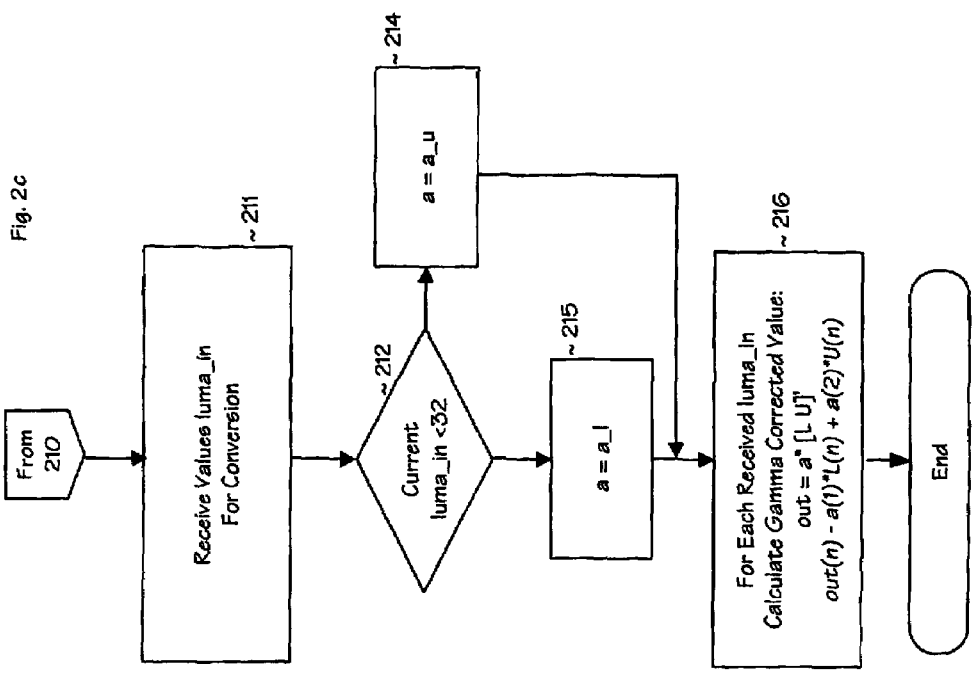
Figure 3:
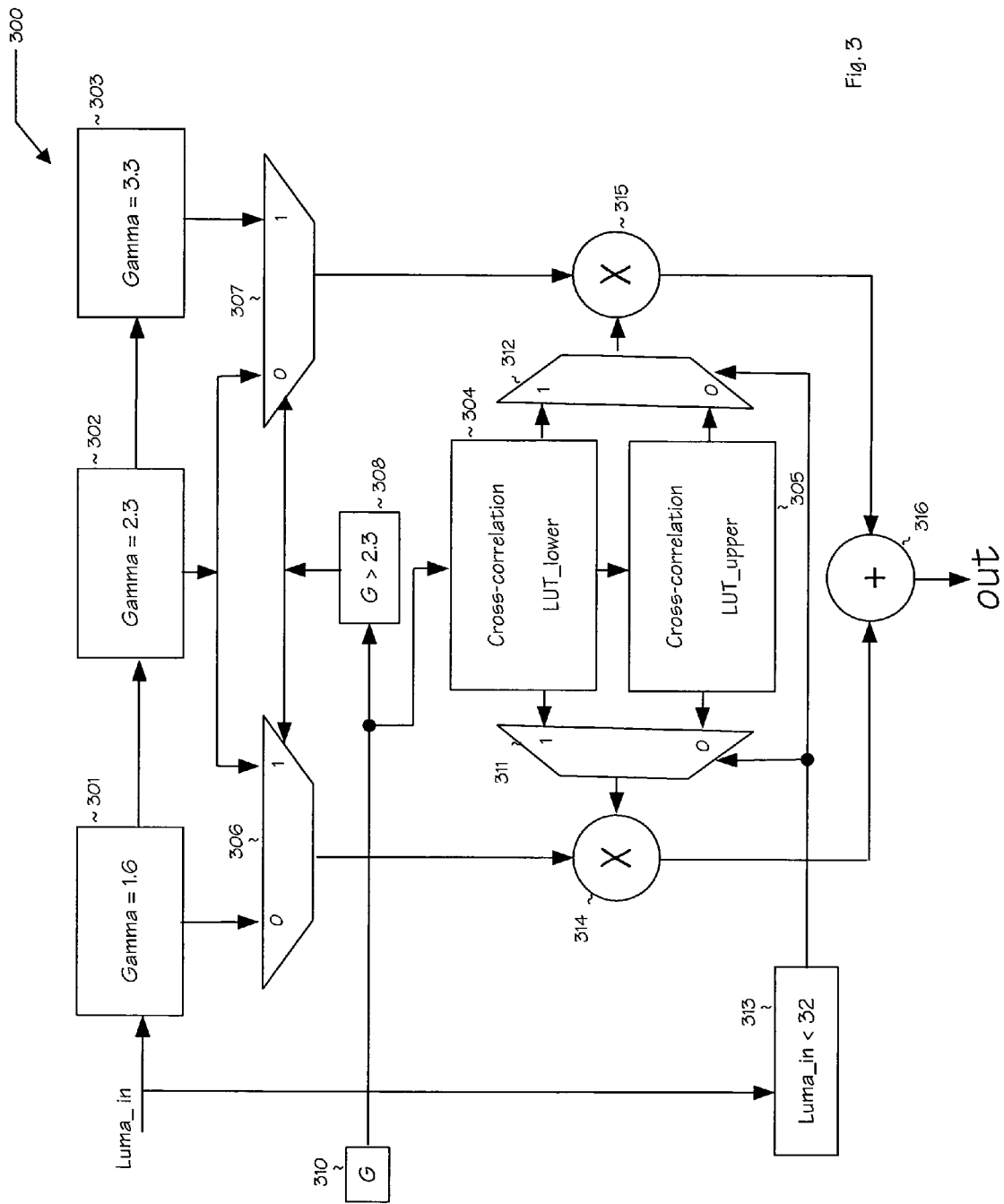
FIG. 3 is a block diagram of a programmable gamma correction circuit embodying the principles of the present invention and suitable for such applications as the gamma correction block of FIG. 1.

The principles of the present invention and their advantages are best understood by referring to the illustrated embodiment depicted in FIGS. 1–3 of the drawings, in which like numbers designate like parts.

FIG. 1 is a high-level block diagram of a video system 100 such as a DVD player suitable for describing one application of the principles of the present invention. Generally, DVD player 100 includes a digital data source, such as DVD processor 101, a digital video encoder 102, and a display system 103, such as a cathode ray tube (CRT) display system.

Encoder 102 inputs data and control signals from DVD processor 101, including digital pixel data, in a format such as the standard YCbCr and YUV formats, along with control signals including the vertical and horizontal synchronization signals. An input demultiplexer (demux) 104 splits the pixel luminance ("luma") (Y) components, the pixel chrominance ("chroma") (CbCr or UV) components, and the timing and control signals.

The luma components are processed through a data path including gamma correction circuitry 105, embodying the principles of the present invention and discussed in further detail below, and luminance ("luma") processing block 106. Luminance processing block 106 performs such operations as interpolation, sharpness enhancement, brightness, and contrast adjustments. Similarly, the chroma components are processed through parallel chroma processing path 107, which performs operations such as interpolation, filtering, and modulation. Timing generator block 108 processes horizontal and vertical synchronization timing to generate a composite synchronization signal.

The outputs from luma processing path 106, chroma processing path 107, and timing generator block 108 are multiplexed by output multiplexer ("mux") 109 into the inputs of output digital-to-analog converters (DACs) 110. DACs 110 provide the analog signals required to drive display system 103. Depending on the particular configuration of display system 103, DACs 110 output analog data in a format such as composite video, S-video, or RGB video.

Programming interface and registers block 111 supports the programmability of various operations of encoder 102 by an external controller. For purposes of the present discussion, programming interface and registers block 111 allows an external controller to program gamma correction block 105 in accordance with the inventive principles discussed below in conjunction with FIGS. 2 and 3.

FIG. 2 is a flow chart illustrating a procedure 200, which generates one or more sets of cross-correlation matrices representing one or more desired gamma correction curves, according to the present inventive principles. The cross-correlation matrices generated in accordance are then stored for later utilization during gamma correction of an incoming luma stream by interpolation between a pair of stored reference curves. One particular circuit suitable for implementing procedure 200 is discussed further below in conjunction with FIG. 3.

For the current cross-correlation matrix being generated, the corresponding gamma value G is selected at Block 201. In the illustrated embodiment, G takes on values between 1.4 and 3.5 in increments of 0.01.

In accordance with procedure 200, at least one pair of precalculated and stored upper and lower reference curves are selected in response to the current gamma value G. In the illustrated embodiment, if G is less than or equal to 2.3 at Block 202, then at Block 203, upper and lower reference curves U(n) and L(n) are selected corresponding to reference gamma values of 2.3 and 1.6 indexed by input values LUMA_IN(n). In addition, a desired gamma curve is generated from the desired gamma value G and input values LUMA_IN (n). The desired gamma curve is generated for calculating the cross-correlation matrices discussed below, although the desired gamma curve is not stored for utilization in actual gamma correction operations since the desired gamma curve is implicit in the corresponding cross-correlation matrices. Specifically:

$U(n) = \text{gamma}(\text{LUMA\_IN}(n), 2.3) = [\text{LUMA\_IN}(n)]^{1/2.3}$;
$L(n) = \text{gamma}(\text{LUMA\_IN}(n), 1.6) = [\text{LUMA\_IN}(n)]^{1/1.6}$; and
$I(n) = \text{gamma}(\text{LUMA\_IN}(n), G) = [\text{LUMA\_IN}(n)]^{1/G}$.

On the other hand, in the illustrated embodiment, if at Block 202, the current gamma value G is greater than 2.3, then a second set of pre-calculated and stored curves is selected at Block 204. In this example, the upper and lower reference curves U(n) and L(n) respectively correspond to reference gamma values of 3.3 and 2.3. A curve representing the application of the desired gamma correction value G to the input values LUMA_IN is generated for cross-correlation matrix calculation purposes. In particular:

$U(n) = \text{gamma}(\text{LUMA\_IN}(n), 3.3) = [\text{LUMA\_IN}(n)]^{1/3.3}$;
$L(n) = \text{gamma}(\text{LUMA\_IN}(n), 2.3) = [\text{LUMA\_IN}(n)]^{1/2.3}$; and
$I(n) = \text{gamma}(\text{LUMA\_IN}(n), G) = [\text{LUMA\_IN}(n)]^{1/G}$.

At decision Block 205, for input values of LUMA_IN(n) less than 32, a first set of cross-correlation matrix entries are calculated at Block 206. The cross-correlation entries for the illustrated embodiment are defined as follows.

The matrix entry $\Phi\text{IL\_I}$ is the numerical value of the expected (mean) of the dot product of the vectors I(n) and L(n) from the curves defined at Block 203 or 204 for values of LUMA_IN(n) less than 32 (i.e. n=0, 1, . . . , 31). In particular:
$\Phi\text{IL\_I} = E(I(n).L(n)) = \text{Mean}[I(0)*L(0) + I(1)*L(1) + \ldots + I(k).L(k)]$,
in which k is a dummy variable between 0 and 31.

The matrix entry $\Phi\text{IU\_I}$ is the numerical value of the expected (mean) of the dot product of the vectors I(n) and U(n) from the curves defined at Block 203 or 204 for values of LUMA_IN(n) less than 32 (i.e. n=0, 1, . . . , 31). In particular:
$\Phi\text{IU\_I} = E(I(n).U(n)) = \text{Mean}[I(0)*U(0) + I(1)*U(1) + \ldots + I(k).U(k)]$,
in which k is a dummy variable between 0 and 31.

The matrix entry $\Phi\text{UL\_I}$ is the numerical value of the expected (mean) of the dot product of the vectors U(n) and L(n) from the curves defined at Block 203 or 204 for values of LUMA_IN(n) less than 32 (i.e. n=0, 1, . . . , 31) or:
$\Phi\text{UL\_I} = E(U(n).L(n)) = \text{Mean}[U(0)*L(0) + \ldots + U(k).L(k)]$.

The matrix entry $\Phi\text{LL\_I}$ is the numerical value of the expected (mean) of the square of the vector L(n) from the curves defined at Block 203 or 204 for values of LUMA_IN(n) less than 32 (i.e. n=0, 1, . . . , 31):
$\Phi\text{LL\_I} = E(L(n).L(n)) = \text{Mean}[L(0)*L(0) + \ldots + L(k).L(k)]$.

The matrix entry $\Phi\text{UU\_I}$ is the numerical value of the expected (mean) of the square of the vector U(n) from the curves defined at Block 203 or 204 for values of LUMA_IN(n) less than 32 (i.e. n=0, 1, . . . , 31). Specifically:

$\Phi UU\_l = E(U(n).U(n)) = \text{Mean}[U(0)*U(0)+ \ldots +U(k).U(k)]$.

For values of LUMA_IN(n) between 32 and 875 (i.e. n=32, ..., 875), the following cross-correlation matrix entries are calculated at Block 207.

The matrix entry $\Phi IL\_u$ is the numerical value of the expected (mean) of the dot product of the vectors I(n) and L(n) from the curves defined at Block 203 or 204 for values of LUMA_IN(n) between 32 and 875 (i.e. n=32, 33, ..., 875). In particular:

$\Phi IL\_u = E(I(n).L(n)) = \text{Mean}[I(32)*L(32)+I(33)*L(33)+ \ldots +I(j).L(j)]$, in which j is a dummy variable between 32 and 875.

The matrix entry $\Phi IU\_u$ is the numerical value of the expected (mean) of the dot product of the vectors I(n) and U(n) for the curves defined at Block 203 or 204 for values of LUMA_IN(n) between 32 and 875 (i.e. n=32, 33, ..., 875). In particular:

$\Phi IU\_u = E(I(n).U(n)) = \text{Mean}[I(32)*U(32)+I(33)*U(33)+ \ldots +I(j).U(j)]$, in which j is a dummy variable between 32 and 875.

The matrix entry $\Phi UL\_u$ is the numerical value of the expected (mean) of the dot product of the vectors U(n) and L(n) from the curves defined at Block 203 or 204 for values of LUMA_IN(n) between 32 and 875 (i.e. n=32, 33, ..., 875) or:

$\Phi UL\_u = E(U(n).L(n)) = \text{Mean}[U(32)*L(32)+U(33)*L(33)+ \ldots +U(j).L(j)]$ in which j is a dummy variable between 32 and 875.

The matrix entry $\Phi LL\_u$ is the numerical value of the expected (mean) of the square of the vector L(n) from the curve defined at Block 203 or 204 for values of LUMA_IN(n) less than 32 and 875 (i.e. n=32, 33, ..., 875):

$\Phi LL\_u = E(L(n).L(n)) = \text{Mean}[L(32)*L(32)+L(33)*L(33)+ \ldots +L(j).L(j)]$.

in which j is a dummy variable between 32 and 875.

The matrix entry $\Phi UU\_u$ is the numerical value of the expected (mean) of the square of the vector U(n) from the curve defined at Block 203 or 204 for values of LUMA_IN(n) between 32 and 875 (i.e. n=32, 33, ..., 875). Specifically:

$\Phi UU\_u = E(U(n).U(n)) = \text{Mean}[U(32)*U(32)+U(33)*U(33)+ \ldots +U(j).U(j)]$.

in which j is a dummy variable between 32 and 875.

The correlation matrix for values of LUMA_IN below 32 is calculated, by utilizing the matrix entries calculated at Block 206 and the following matrix equation:

$$a\_I = [\Phi IL\_I, \Phi IU\_I]^* \begin{bmatrix} \Phi LL\_I & \Phi UL\_I \\ \Phi UL\_I & \Phi UU\_I \end{bmatrix}^{-1}$$

in which a_I is a one by two matrix [a_I(1) a_I(2)].

The correlation matrix for values of LUMA_IN in the range of 32 to 875 is calculated at Block 209, using the matrix entries calculated at Block 207 from the matrix equation:

$$a\_u = [\Phi IL\_u, \Phi IU\_u]^* \begin{bmatrix} \Phi LL\_u & \Phi UL\_u \\ \Phi UL\_u & \Phi UU\_u \end{bmatrix}^{-1}$$

in which a_u is a one by two matrix [a_u(1) a_u(2)].

for each value of G programmed, four cross-correlation coefficients corresponding to matrices a_I and a_u are stored in memory of Block 210, for example in a LUT, for latter utilization during gamma correction operations on received values of LUMA_IN. One particular exemplary LUT embodiment is discussed below in conjunction with FIG. 3.

During display generation, luma values are received at Block 211 for conversion. For values of luma_in less than thirty-two (32) at decision Block 212, a is taken as a_I at Block 215, otherwise a is taken as a_u at Block 214. At Block 216 the gamma corrected value of a current input value LUMA_IN by the desired gamma value G is calculated as:

$$\text{out} = a*[LU]'$$

in which [LU]' is the transpose of a matrix representing the lower (L) and upper (U) reference curves selected at Block 202. Alternatively expressed, each gamma corrected value for the desired gamma correction value G is calculated as:

$$\text{out}(n) = a(1)*L(n) + a(2)*U(n)$$

in which OUT(n) is the gamma corrected value being calculated for the current input value LUMA_IN(n), L(n) is the value along the lower reference curve corresponding to the current luma_in(n), U(n) is the value along the upper reference curve corresponding to the current LUMA_IN(n), a(1) is the cross-correlation matrix entry at the first column of the one by two (1×2) matrix calculated at Block 208 or Block 209, and stored at Block 210, corresponding to the desired value of G, and a(2) is the cross-correlation matrix entry the second column of the one by two (1×2) matrix calculated at Block 208 or Block 209, and stored at Block 210, corresponding to the desired value of G.

In alternate embodiments, linear interpolation may be utilized to generate a particular gamma curve from two or more of the reference curves. However, due to the non-linear nature of the reference curves, as well as the non-linear nature of the particular gamma curve being generated, and the correlation among themselves is also non-linear, therefore, linear interpolation is not as accurate as the non-linear interpolation techniques described above.

FIG. 3 is a block diagram of a programmable gamma correction circuit 300 embodying the principles of the present invention and suitable for such applications as gamma correction block 105 of FIG. 1.

In the illustrated embodiment, three reference curves corresponding to reference gamma values 1.6, 2.3, and 3.3 are stored in corresponding memory spaces 301–303. The reference gamma values may be stored in memory spaces 301–303 as LUTs or as piecewise linear approximations of at least 64 segments. Memories 301–303 are indexed by the current value of LUMA_IN.

According to the principles of the present invention, gamma curves may be generated between a minimum gamma value (e.g. 1.4) and a maximum gamma value (e.g. 3.5). In the preferred embodiment, the locations of the lower and upper reference gamma curves are not placed at the exact minima and maxima endpoints, and also the middle reference gamma curve is not placed at the exact middle point of this range (1.4–3.5) of gamma values. Rather, the lower and upper reference gamma curves are placed slightly inside the minimum and maximum endpoints, and the middle reference curve location is also slightly different from the exact mid location of the above minimum and maximum range. For example, the endpoints of the programmable gamma range are at 1.4 and 3.5 and their midpoint is at 2.45, but the three fixed reference curves are placed at gamma values of 1.6, 3.3 and 2.3, respectively. To generate gamma correction curves with gamma values between 1.4 and 1.6, and 3.3 and 3.5, non-linear extrapolation is performed. Due to the non-linear characteristics of the reference curves, the curves being generated, as well as the correlation amongst themselves, selecting gamma values for generating the reference curves, which are slightly within the maximum and minimum available gamma values and slightly different from the mid point of this range, has been found to minimize overall errors.

For each value of G programmed in accordance with procedure 200, the lower cross-correlation matrix a_l is stored in LUT 304, while the corresponding upper cross-correlation matrix a_u is stored in LUT 305.

A set of selectors (multiplexers) 306 and 307 select, in response to the output of comparator 308, upper and lower reference values indexed by the current value of GAMMA G. Specifically, if the current desired input value G, which is stored in register 310, is less than or equal to 2.3, then the output from memory 301 is the lower reference gamma value and the output from memory 302 is the upper reference gamma value. On the other hand, if the current value of G in register 310 is greater than 2.3, then the output from memory 302 becomes the lower reference gamma value and the output from memory 303 is the upper reference gamma value.

The current value of G in register also indexes the entries of corresponding upper and lower cross-correlation matrices a_l and a_u stored in LUTs 304 and 305. The particular matrix accessed is selected by selectors (multiplexers) 311 and 312 under control of the output comparator 313. In particular, when the current value of LUMA_IN is less than 32, then the indexed matrix from lower LUT 304 is accessed, otherwise the indexed matrix from upper LUT 305 is accessed.

The gamma corrected luminance value OUT is calculated, in accordance with Block 216 of procedure 200 of FIG. 2, by multipliers 314 and 315 and adder 316. Specifically, for the selected matrix from either LUT 304 or 305, multiplier 314 multiplies the entry a(1) with the selected lower reference gamma value output from multiplexer 306. The access matrix entry a(2) is multiplied by multiplier 315 by the upper reference gamma value output from multiplexer 307. The final gamma corrected output value OUT is then generated by summer 316 by taking the sum of the output of multipliers 314 and 315.

In system 100 shown in FIG. 1, the gamma corrected luminance value OUT is passed to video interpolation and processing block 106 for further processing.

While a particular embodiment of the invention has been shown and described, changes and modifications may be made therein without departing from the invention in its broader aspects, and, therefore, the aim in the appended claims is to cover all such changes and modifications that fall within the true spirit and scope of the invention.

What is claimed is:

1. A gamma correction circuit, comprising:
    input circuitry responsive to an input data value for generating first and second preliminary values based on data selected from first and second correction curves;
    first selection circuitry for selecting in response to a gamma value the first and second correction curves from a plurality of at least three correction curves;
    second selection circuitry for dynamically selecting in response to the input data value one of first and second sets of gamma gain value matrices;
    gain generation circuitry responsive to the gamma value for generating first and second gain values from the selected one of first and second sets of gamma gain value matrices; and
    output circuitry for combining the first and second preliminary values and the first and second gain values to generate a corrected output value.

2. The gamma correction circuit of claim 1, wherein the output circuitry comprises:
    a first multiplier for calculating a first product from the first preliminary value and the first gain value;
    a second multiplier for calculating a second product from the second preliminary value and a second gain value; and
    an adder for adding the first and second products to generate a corrected output value.

3. The gamma correction circuit of claim 1, further comprising a set of at least one table for storing the first and second correction curves.

4. The gamma correction circuit of claim 1, further comprising a set of at least one table for storing the first and second gain value matrix sets and circuitry for selectively accessing the first and second gain values from the selected set of gamma gain matrices in response to the gamma value.

5. The gamma correction circuit of claim 1, wherein the data value comprises a luma value.

6. A method of correcting a data value given a gamma value, comprising:
    selecting in response to a desired gamma value first and second correction curves from a plurality of at least three gamma correction curves;
    selecting in response to the input data value a set of gamma gain value matrices from a plurality of sets of gamma gain matrices;
    in response to an input data value to be corrected, generating first and second preliminary values based on data selected from the first and second correction curves;
    in response to the desired gamma value, generating first and second gain values from the selected set of gamma gain matrices; and
    combining the first and second preliminary values and the first and second gain values to generate a corrected output value.

7. The method of claim 6, wherein combining the first and second preliminary values and the first and second gain values comprises:
    calculating a first product from the first preliminary value and the first gain value, calculating a first product from the second preliminary value and a second gain value; and
    adding the first and second products to generate a corrected output value.

8. The method of claim 6, wherein selecting first and second correction curves comprises selecting first and second stored correction curves from a plurality of at least three stored correction curves.

9. The method of claim 8, wherein the first and second stored correction curves are selected from first and second tables.

10. The method of claim 6, wherein generating first and second gain values comprises selecting one of first and second sets of gamma gain matrices stored in a set of tables.

11. The method of claim 6, wherein the data value comprises a luma value.

12. A method of performing gamma correction on a received value, comprising:

generating a plurality of at least three gamma correction curves, wherein each gamma correction curve is indexed by received input values being gamma corrected and is selectable by a corresponding gamma value;

generating a plurality gain matrix sets each dynamically selectable by the received input values, wherein each gain matrix set includes a set of gain value matrices each selectable by a corresponding gamma value;

generating first and second gain values by dynamically selecting one of the gain value matrix sets with a current received input value and selecting one of the gain matrices within the selected gain matrix set with a desired gamma value;

generating first and second preliminary gamma corrected values by selecting first and second ones of the plurality of gamma correction curves with the desired gamma value and dynamically indexing the selected first and second gamma correction curves with the currently received input value; and generating a current gamma corrected value by combining the first and second preliminary gamma corrected values and the first and second gain values.

13. The method of claim 12, further comprising storing the plurality of gamma correction curves in at least one table.

14. The method of claim 12, wherein generating

15. The method of claim 12, wherein generating a correction value by combining the first and second preliminary gamma corrected values and the first and second gain values comprises:

multiplying the first gain value and the first preliminary gamma corrected value to generate a first product;

multiplying the second gain value and the second preliminary gamma corrected value to generate a second product; and summing the first and second products to generate the correction value.

16. A method of performing gamma correction on a received value comprising:

receiving an input value for gamma correction and an input gamma value;

combining a plurality of gamma corrected values taken from a pair of gamma correction curves, the pair of gamma correction curves selected from a plurality of gamma correction curves in response to the input gamma value, and plurality of gain values taken from one of a plurality of sets of gain matrices, the one of the plurality of sets of gain matrices selected in response to the input value for gamma correction to generate a gamma corrected output value.

17. The method of claim 16, wherein combining a plurality of gamma corrected values and a plurality of gain values comprises:

selecting at least two gamma corrected values from corresponding gamma correction curves;

selecting at least two gain values from a gain matrix indexed by the input gamma value and selected from one of the plurality of sets of gain matrices by the input value for gamma correction; and combining a first gamma value and a first gain value and a second gamma value and a second gain value to generate the gamma corrected output value.

18. The method of claim 16, wherein the received value for gamma correction comprises video data.

19. The method of claim 18, wherein the video data comprises luma data.

* * * * *